United States Patent [19]
Matsuda

[11] Patent Number: 5,987,163
[45] Date of Patent: Nov. 16, 1999

[54] APPARATUS AND METHOD FOR DETERMINING THE SIZE OF A PAGE SIZE IN AN IMAGE READER

[75] Inventor: Shinya Matsuda, Kyoto, Japan

[73] Assignee: Minolta Co., Ltd., Osaka, Japan

[21] Appl. No.: 08/882,109

[22] Filed: Jun. 25, 1997

[30] Foreign Application Priority Data

Jun. 26, 1996 [JP] Japan ................................. 8-165709

[51] Int. Cl.$^6$ ...................................................... H04N 1/04
[52] U.S. Cl. ........................................... 382/154; 358/488
[58] Field of Search ................................... 358/488, 449, 358/474; 382/203, 154

[56] References Cited

U.S. PATENT DOCUMENTS

| | | | |
|---|---|---|---|
| 5,035,885 | 7/1991 | Telle | 358/449 |
| 5,231,516 | 7/1993 | Kamon et al. | 358/449 |
| 5,325,213 | 6/1994 | Takahashi et al. | 358/474 |
| 5,377,019 | 12/1994 | Okisu et al. | 358/464 |
| 5,610,720 | 3/1997 | Fujioka et al. | 358/296 |

FOREIGN PATENT DOCUMENTS 6-205194   7/1994   Japan .

*Primary Examiner*—Thomas D Lee
*Assistant Examiner*—Stephen Brinich
*Attorney, Agent, or Firm*—McDermott, Will & Emery

[57] ABSTRACT

The present invention relates to an image reader well suited for reading for reading bound documents such books and magazines, the image reader comprises a document table to support a document to be read, an image sensor to convert a document image to electrical signals, and a signal processing unit to quantize and output said electrical signals to external devices. The signal processing unit is constructed so as to be capable of reading the edge surfaces in a direction perpendicular to the lateral direction of a document in an open-faced state and is provided with a size detector to detect the document edge positions on bilateral sides of the open-faced document in a lateral direction, a page size calculator to calculate the length of one page in a lateral direction of said open-faced document based on the read information of the edge surfaces and document edge position detected by said document size detector, and output range setting device to set the image output range in accordance with the length of one page calculated by the page size calculator.

21 Claims, 8 Drawing Sheets

sub scan direction

FIG. 3(B)

main scan direction

APPARATUS AND METHOD FOR DETERMINING THE SIZE OF A PAGE SIZE IN AN IMAGE READER

BACKGROUND OF THE INVENTION

1. Field of the Invention

The present invention relates to an image reader well suited for reading bound documents such as books and magazines.

2. Description of the Related Art

Image readers have been commercialized as book scanners. In such devices, an image sensing unit is arranged above a document table so as to have an open space of several tens of centimeters between said image sensing unit and said document table. When reading a bound document (hereinafter referred to as "book document") such as a book, magazine and the like, a user places the book document on the document table in an open state facing upward. Scanning of the document surface (reading target surface) begins when the start key is turned ON, and the document image read in conjunction with said scan is sequentially output to an external device. If the external device is a printer, a copy image is formed in real time. When using a book scanner, the operation of reading multiple pages is accomplished with high efficiency because the pages can be turned while the document is on the document table. Furthermore, damage to the book is markedly reduced in comparison to arrangements wherein the book is placed in an open state facing downward. The aforesaid book documents include file-type documents. Unlike single sheet documents, the document surface of book documents are curved. Therefore, distortion corresponding to said state of curvature appears in the read image. A read image corrected for said distortion is output to the external device, i.e., a read image is output which has an image quality identical to the read image of a sheet document. Methods of detecting the state of curvature of a document surface include a method of image analysis accomplished by reading the so-called "head" portion of a book document (Japanese Laid-Open Patent Application No. 5-161002).

In reading book documents, the edge (the so-called "fore-edge" of the book) of overlapping sheets appearing at bilateral sides of the document surface when a book document is in an open state are read together with the document surface. The read image of this fore-edge is unnecessary information and detracts from the appearance of the output image. Conventionally, there are two well-known methods of outputting an image which does not include the read image of the fore-edge. A first method utilizes the difference in luminance between the edge and the background of the document surface to detect the border between the edge portion and the document surface in the read image so as to erase the image outside said border. A second method detects the inflection point of the change in height of the document surface, and erases the read image on the exterior side of said inflection point.

However, in the first method utilizing the difference in luminance, disadvantages arise inasmuch as the document surface and edge portion cannot be distinguished when there the difference in luminance is slight as in the case, for example, of old books documents wherein the pages have become yellowed or faded. Furthermore, in the second method of checking for changes in the height of the document surface, disadvantages arise inasmuch as errors readily occur in the inflection point detection because a clear inflection point may not exist as in the case of relatively thin documents such as magazines and thin volumes.

SUMMARY OF THE INVENTION

An object of the present invention is to set a suitable output image range by accurately distinguishing the size of a document surface regardless of the thickness of the document or faded color of the document surface.

These objects are achieved by providing an image reader comprising: a document table to support a document to be read; image sensing means to convert a document image to electrical signals; and signal processing unit to quantize and output said electrical signals to external devices, wherein said signal processing unit is constructed so as to be capable of reading the edge surfaces in a direction perpendicular to the lateral direction of a document in an open-faced state and is provided with a size detection means to detect the document edge positions on bilateral sides of said open-faced document in a lateral direction, a page size calculation means to calculate the length of one page in a lateral direction of said open-faced document based on the read information of the edge surfaces and document edge position detected by said document size detection means, and output range setting means to set the image output range in accordance with the length of one page calculated by said page size calculation means, and wherein, based on the read information of said edge surfaces, said page size calculation means discriminates a first case wherein the edge on the side opposite the document surface is parallel to the document support surface along the entire bilateral length, a second case wherein said edge is parallel only on a unilateral side, and a third case of all other occurrences, and in said first case determines the difference between the sum of the dimensions of said edge surface in the document thickness direction at each edge and the distance between said bilateral edge positions so as to calculate ½ the length of said difference as the length of one page, and in said second case calculates the length of the part of said edges parallel to the document support surface as the length of one page, and in said third case calculates the contour distance of said edge between the document edge position on one side detected by said document size detection means and the position nearest said document edge position at the same height as said document edge position near the center of the edge surface in a lateral direction as the length of one page, and in said image reader, the document size of one page is determined from the read information of the part corresponding to the edge of an open-faced book in a direction perpendicular to the lateral direction, i.e., the "head" of the book, and bilateral edge position information of the open-faced document.

The position a distance of the document size from the center of the open-faced document in the lateral direction is the border between the document surface and the exterior edge (fore-edge). Therefore, if the document size is determined, the read image of the edge areas which are unnecessary images may be erased. The open-faced center may be determined as the reference position for document placement, and may be specified by analysis of reading information. Furthermore, if the output image range is set in accordance with the determined document size, execution of automatic magnification selection (AMS) to vary the magnification (enlargement/reduction) of a read image suitable for a specified recording sheet, and automatic paper selection (APS) to select a recording sheet suitable to the specific magnification may be accomplished with the same effectiveness as when reading sheet documents.

These and other objects, advantages and features of the invention will become apparent from the following description thereof taken in conjunction with the accompanying drawings which illustrate specific embodiments of the invention.

BRIEF DESCRIPTION OF THE DRAWINGS

In the following description, like parts are designated by like reference numbers throughout the several drawings.

DESCRIPTION OF THE PREFERRED EMBODIMENTS

Figure 1:
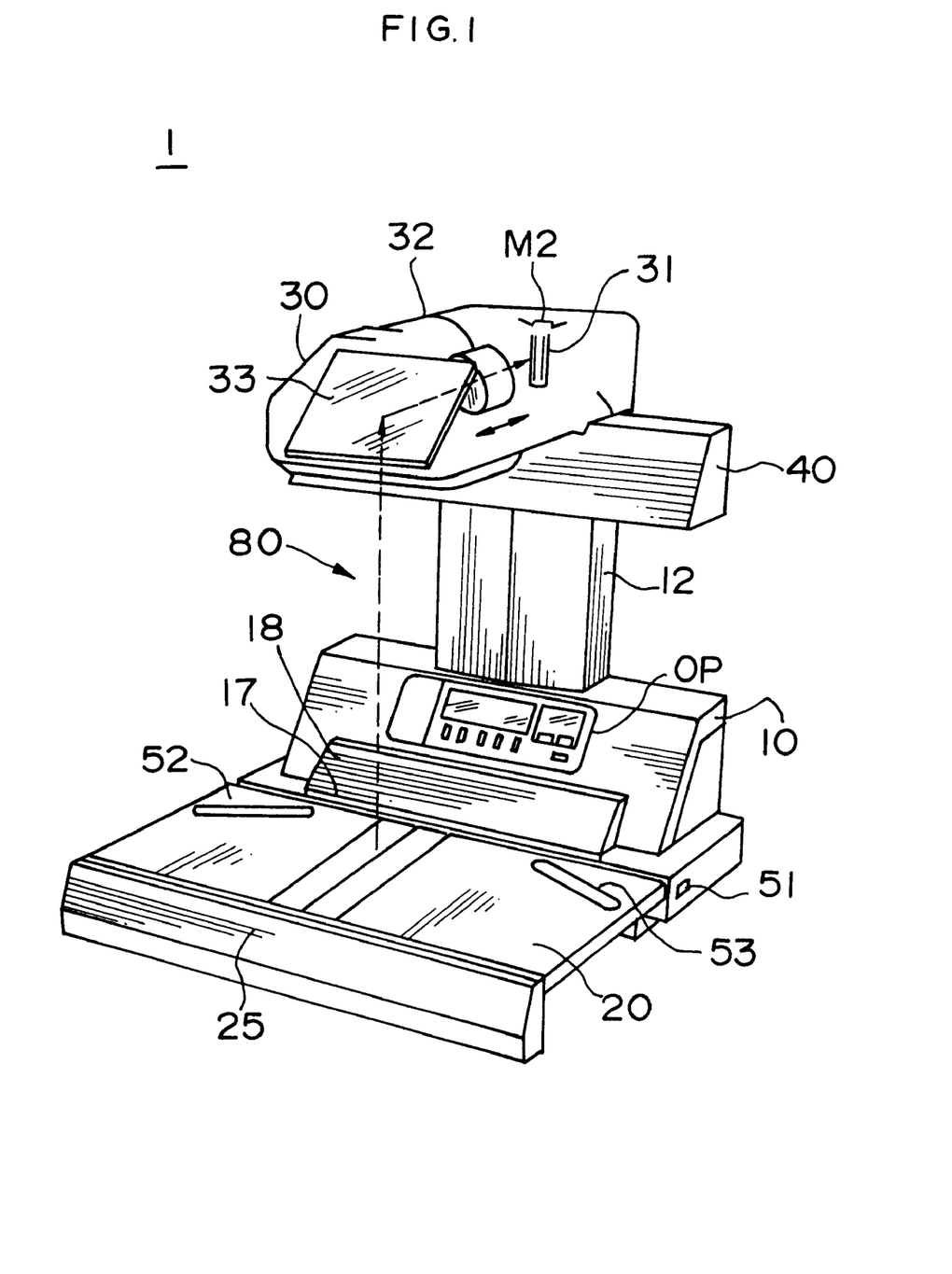
FIG. 1 is a perspective view showing the exterior of a book scanner.
Figure 2:
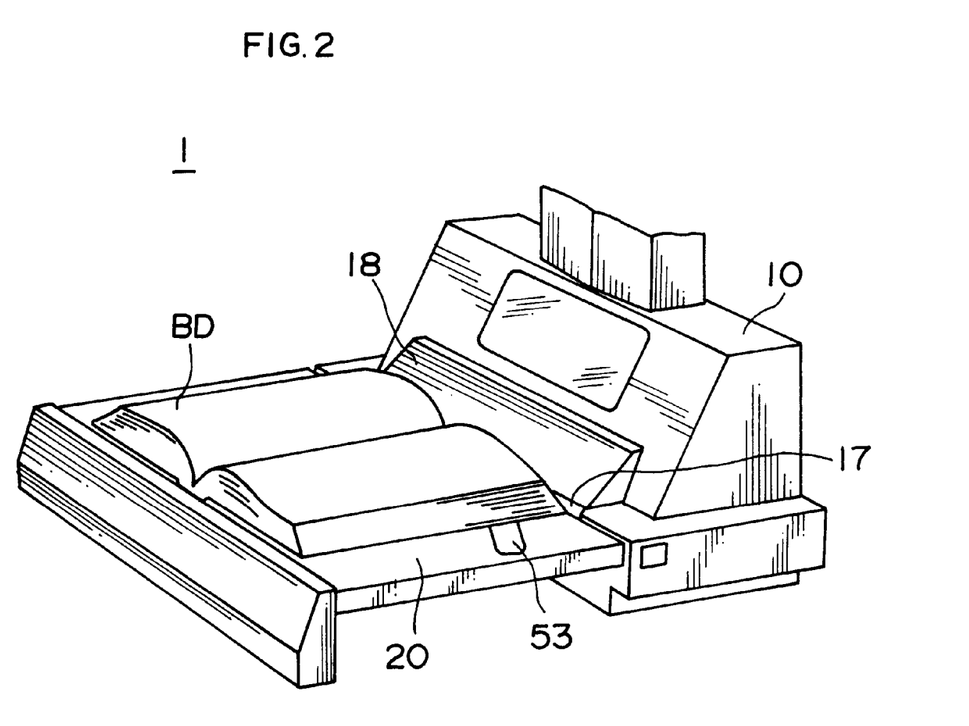
FIG. 2 illustrates the use state of the book scanner.
Figure 3A:
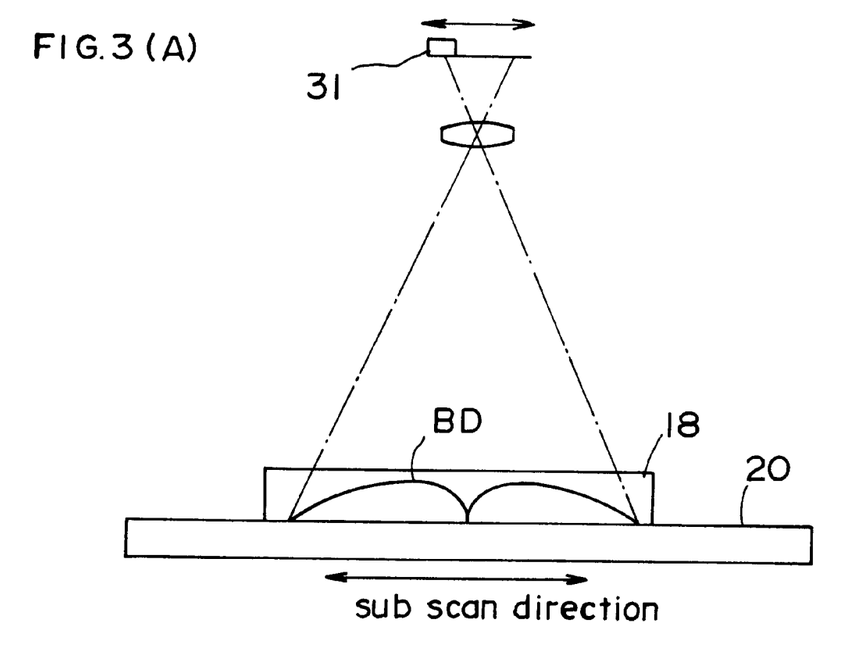
FIGS. 3A–3B illustrate the reading mode of the book scanner.
Figure 3B:
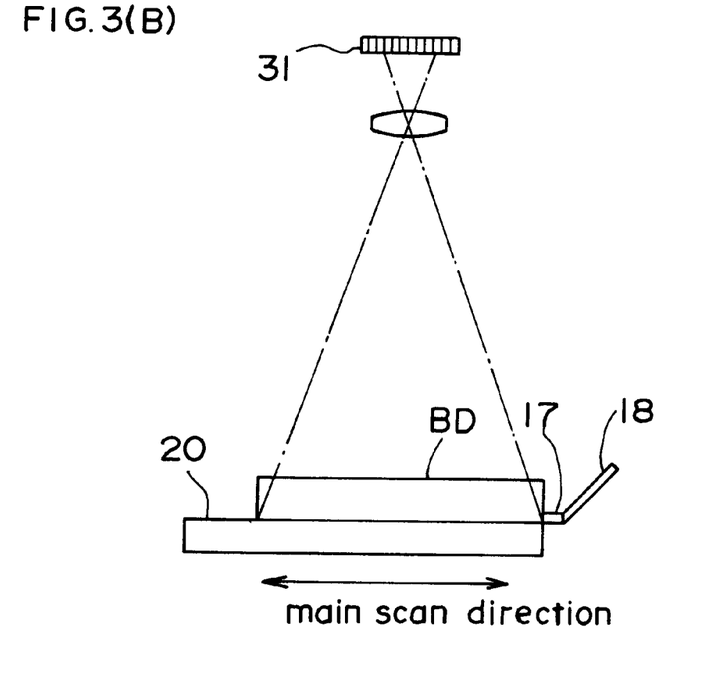

FIG. 1 is a perspective view of the exterior of a book scanner 1; FIG. 2 illustrates the use state of book scanner 1; and FIG. 3 illustrates the reading mode of book scanner 1.

Book scanner 1 is an image reader suitable for reading book-like documents (open-faced documents), and comprises a body housing 10 accommodating electrical circuits and the like, a dark colored document table 20 to support a document, image sensing unit 30 to convert a document image to electrical signals, and lamp unit 40 to illuminate a document. Document table 20 is disposed at the front side of body housing 10. Image sensing unit 30 is arranged above document table 20 and is supported in an overhang-type configuration by column 12 extending vertically upward from the top surface of body housing 10. Lamp unit 40 is fixedly mounted on column 12 at a position on the bottom surface of image sensing unit 30. An open space 80 formed between document table 20 and image sensing unit 30 is open relative to the device exterior, and is of sufficient size to accommodate the placement of book documents. The distance between document table 20 and the bottom surface of image sensing unit 30 is 30 cm or more.

An operation panel OP including a liquid crystal display is provided at the front top edge of body housing 10, and a projection panel 18 is fixedly mounted at the bottom edge to detect the height of the document surface. The surface of projection panel 18 is a glossy surface which is inclined at 45° relative to the top surface of the document table 20. The image of the "head" of the edge surface in a direction perpendicular to the lateral direction of a book document is reflected in projection panel 18, and the condition of said reflection in projection panel 18 is read together with the document image. A flat surface 17 of fixed width and dark color is provided between the bottom edge of projection panel 18 and document table 20.

A main switch 51 is provided at the right side of body housing 10 when viewed facing operation panel OP. Start keys 52 and 53 are respectively provided opposite on bilateral sides of document table 20 to allow users to start a reading operation, and an arm rest 25 is provided at the front side.

In FIG. 1, image sensing unit 30 has a line sensor 31 comprising a charge-coupled device (CCD), and image forming lens 32, and mirror 33. A document image is projected onto the photoreceptor surface of line sensor 31 via mirror 33 and image forming lens 32. Image forming lens 32 is constructed so as to be movable in front-to-back directions, and is positioned by an autofocus (AF) mechanism not shown in the drawings. Line sensor 31 is attached to a movable body of a scanning mechanism not shown in the drawing, so as to be movable horizontally along the lateral direction (subscan direction) M2 while the direction of the array of the CCD elements are maintained in a vertical direction. A two-dimensional reading of a document image is accomplished by the aforesaid horizontal movement. That is, in book scanner 1, a two-dimensional image sensing plane is formed by the movement of line sensor 31. When an area sensor is used instead of line sensor 31, the photoreceptor surface of said area sensor becomes the image sensing plane. The main scan direction of the document image is the front-to-back direction on document table 20, and the vertical direction on the image sensing plane.

When using book scanner 1, a user places an open-faced book document BD face up on the document table 20, as shown in FIG. 2. At that time, the border between right and left pages is aligned with the center in a lateral direction of book document BD, and book document BD is pushed against the front edge of flat surface 17 to position the document in the front-to-back direction. The border between flat surface 17 and document table 20 becomes the reference line of document placement. Document table 20 is supported by spring mechanisms so as to be movable downward in accordance with the weight of the document. Thus, the distance between the document surface and the mirror 33 remains within a constant range regardless of the thickness of book document BD.

Book scanner 1 executes a prescan and a main scan on the same document. Since book document BD has a curved document surface unlike a sheet document, it is necessary to adjust the image sensing focus in accordance with the state of curvature. Processing to correct image distortion and differences in luminance are also required. Therefore, the state of curvature is detected in a prescan, and the main scan operation settings are determined based on the prescan detection results. Image output to external devices occurs during the main scan, reading modes include a bilateral pages batch reading mode (sheet document mode), and bilateral pages individual page reading mode (book division mode). In both reading modes, both a prescan and a main scan are executed for each page.

Figure 4A:
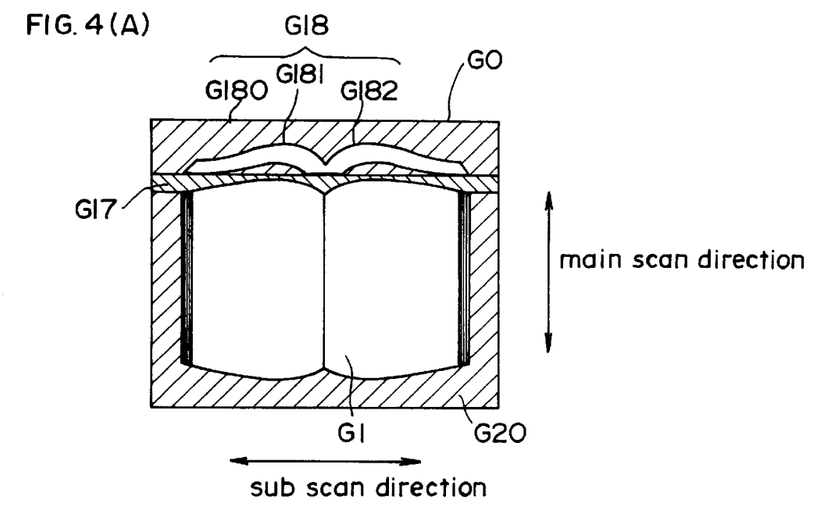
FIGS. 4A–4B illustrate the method of measuring the state of curvature of a document surface.
Figure 4B:
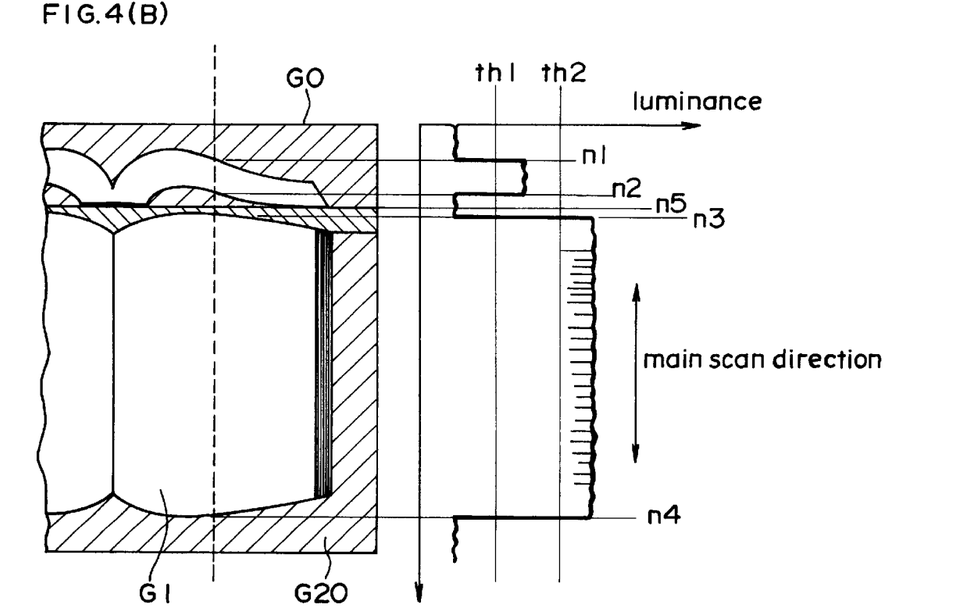

FIG. 4 illustrates the method of measuring the state of curvature of a document surface. The dashed line in FIG. 4(B) indicates the position of the subject line.

A read image G0 comprises the read image G1 of book document BD, the read image G20 of document table 20, the read image G17 of flat surface 17, and the read image G18 of projection panel 18. The images G181 and G182 in projection image G18 express the shape of top edge surface (hereinafter referred to as "head") of a placed book document BD. The areas of read image G18 other than read images G181 and G182 are the background images reflected on projection panel 18.

Since the document table 20 and flat surface 17 are dark in color as previously mentioned, the read images G20 and G17 corresponding to said table and surface produce darker images in comparison to other images. Therefore, the read images G1 and images G181 and G182 can be extracted by distinguishing the image value of the read image G0. Specifically, the luminance (pixel value) are checked sequentially from the first pixel of each line in the main scan direction, and the pixel positions (pixel numbers) n1 and n2 on the leading side and trailing side of a range in which the luminance exceeds a first threshold th1 are detected, and the pixel positions n3 and n4 on the leading side and the trailing side of a range in which luminance exceeds a second threshold th2 (where th2>th1) are detected. The number of pixels between the pixel position n1 and the pixel position n5 corresponding to the front edge of projection panel 18 corresponds to the height of the document surface at said line, and the number of pixels between pixel position n3 and pixel position n4 corresponds to the document size in the main scan direction. The actual dimensions are determined by dividing the number of pixels by the image sensing resolution. The state of curvature of a document surface is specified by combining the data expressing the height of the document surface at all lines. The positions of the first lines and last lines at which the pixel positions n3 and n4 are detected correspond to the bilateral end positions of the document in the subscan direction.

In read image G0, the top edge and bottom edge of read image G1 form a curve because the height of the document surface is not constant. That is, an object near the image sensing plane forms larger than an object near the image sensing plane forms larger than an object farther away. During the main scan, image processing (image distortion correction) is executed to correct an image of a curved read image G1 when the height of the document surface is not constant based on document surface height information obtained during the prescan. Specifically, regarding the main scan direction, the plane at a position a fixed distance (e.g., 5 cm) above the document table 20 is set as a reference plane, and the read image G1 is magnified in accordance with difference between the document surface and the reference plane at each position in the subscan direction. Regarding the subscan direction, the read image G1 is magnified in accordance with the ratio of the projection distance of the document surface to the document table 10 and the contour distance of the document surface at each small interval.

Figure 5:
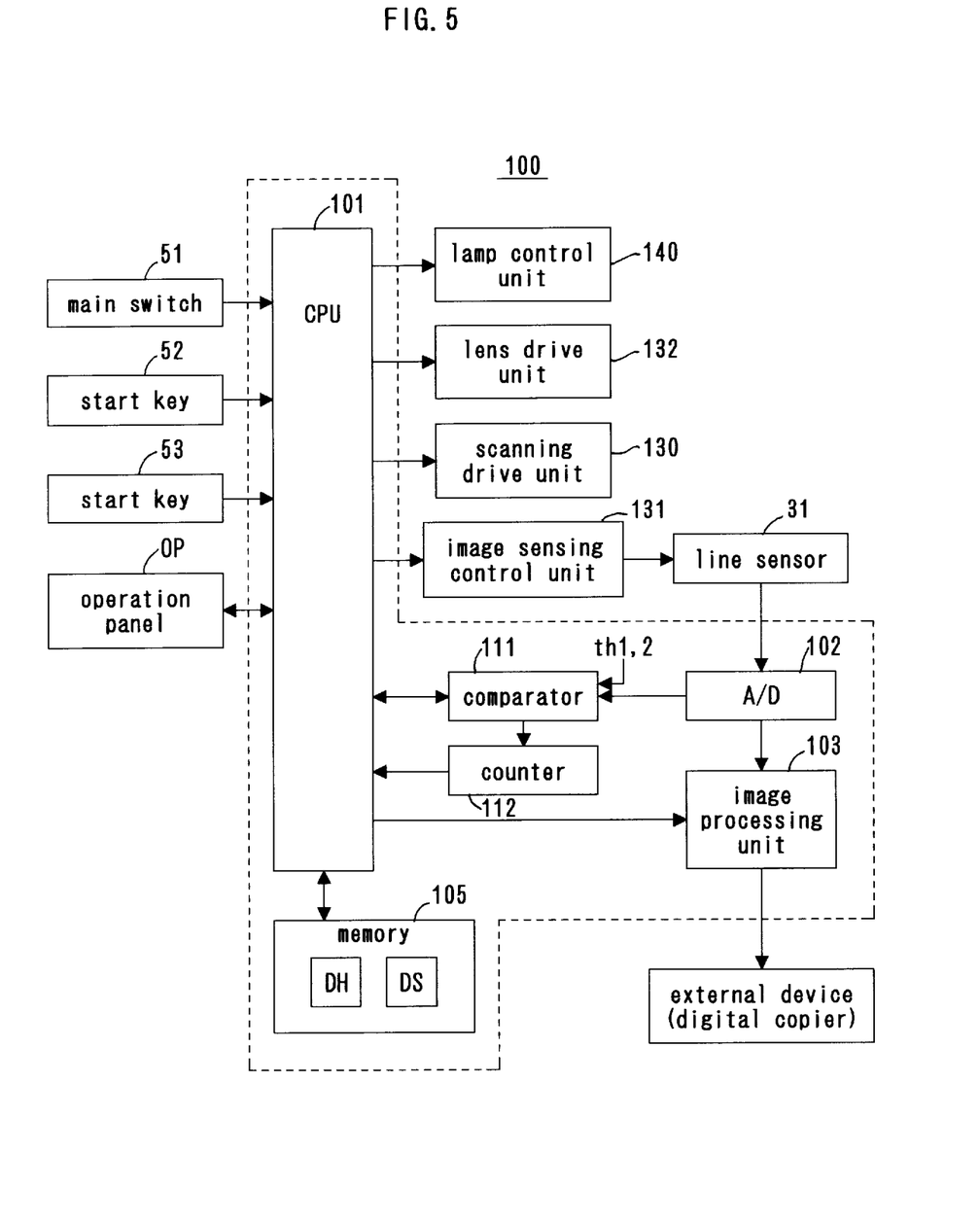
FIG. 5 is a block diagram of the essential part of the signal processing unit of the book scanner.

FIG. 5 is a block diagram of the essential part of the signal processing unit 100 of book scanner Signal processing unit 100 comprises a central processing unit (CPU) 100, analog-to-digital (A/D) converter 102, image processing unit 103 memory 105, comparator 111, and counter 112.

During prescanning, the output of line sensor 31 is converted to, for example, 8-bit image data by A/D converter 102 and input to comparator 111 in the pixel array sequence. Comparator 111 compares the values of the input image data to the threshold values th1 and th2, and supplies the comparison results to CPU 101 and counter 112. That is, the height of the document surface is measured. CPU 101 fetches the count value of counter 112 and generates document height data DH expressing the state of curvature of the document surface. Furthermore, the pixel positions n3 and n4 detected by comparator 111 are fetched, and size data DS are generated to express the flat surface size of the document. The document height data DH and size data DS are temporarily stored in memory 105. After the prescan ends, CPU 101 generates data to correct irregular illuminance and correct image distortion as preparation for the main scan based on the document height data DH and size data DS. Then, the length of the document surface in the subscan direction (page length) is determined, and the output image range (effective reading range) is set.

During the main scan, the output of line sensor 31 is converted to, for example, 8-bit image data by A/D converter 102 and input to image processing unit 103. Image processing unit 103 executes processes to correct irregular luminance of the document surface, variable magnification process including correction of distortion arising from the curvature of the document surface and MTF correction to improve image quality, density correction, and image editing to make areas outside the output image range as blank white areas. Image data subjected to specific image processing are output to external devices (e.g., a digital copier). CPU 101 controls the image sensing control circuit 131, and drive units including the scanning drive unit 130, lens drive unit 132 and lamp control unit 140. CPU 101 is connected to operation panel OP and various types of switches. Memory 105 is used to temporarily store various data relating to control.

FIG. 6 illustrates the method of calculating page length in the present invention.

The form of contact open-faced book document and the document table 10 can be broadly divided into three types. FIG. 6(*a*) shows a first form with a hardcover book document viewed open-faced with equal thickness on bilateral sides, and the entire surface of the cover is in contact or near contact with the document table 20 at bilateral sides of the placement reference position (center line of document table 20) PC. When focusing on the shape of the edge surface S3 of the head side of the book document including a hardcover, the edge (bottom edge) e32 on the side opposite the document surface side is parallel relative to document table 20 across the entire length in a lateral direction. FIG. 6(*b*) shows a second form with a hardcover book document viewed open-faced with extremely divergent thicknesses on either side, and the entire surface of the cover is in contact with or near contact with document table 20 on only a unilateral side. The bottom edge e32 of edge surface S3 is parallel to document platen 20 on only one side. FIG. 6(*c*) shows a third form with a softcover book document viewed open-faced with equal thickness on bilateral sides, and only the center part and bilateral edges are in contact with document table 20. In this form, the majority of bottom edge e32 of edge surface S3 is curved. The form shown in FIG. 6(*d*) with softcover book document viewed open-faced with markedly divergent thicknesses on bilateral sides is the second form shown in FIG. 6(*d*).

These three forms can be distinguished by analyzing the read image G18 of projection panel 18 shown in FIG. 4. That is, whether or not book document BD is in contact with document table 20 at each line in the subscan direction is discriminated by the distance between pixel position n2 (refer to FIG. 4(B)) corresponding to bottom edge e32 of edge surface S3 and the pixel position n5 corresponding to the front edge of projection panel 18, and the distribution of lines in contact will correspond to one of the aforesaid three forms.

The method of calculating page length dp of each of the previously mentioned forms is described below.

Figure 6A:
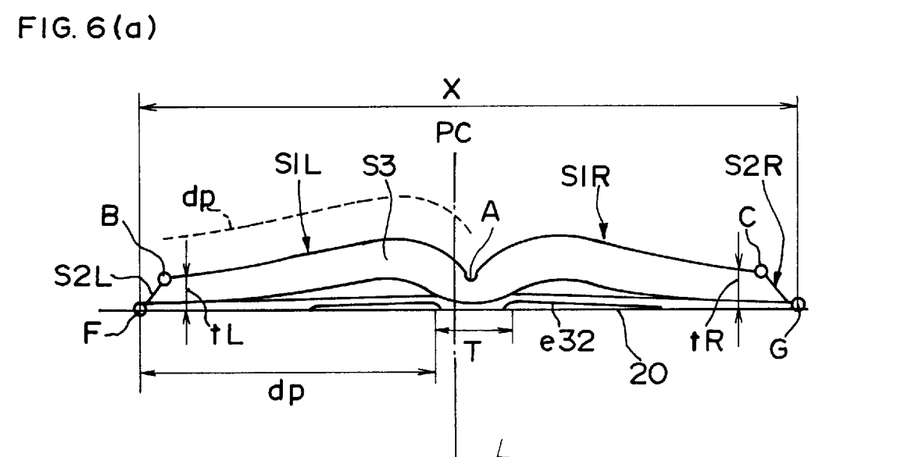
FIGS. 6a–6d illustrate the method of calculating page length in the present invention.

In the case of the first form shown in FIG. 6(*a*), the length T of the thickness part is subtracted from the distance X form the left side document edge position F to the right side document edge position G, and ½ of the obtained difference is designated page length dp. The length T of the thickness part is the sum of the left side thickness tL and the right side thickness tR. That is, page length dp can be expressed by Equation (1) below.

$$dp=(X-T)/2=[X(tL+tR)]/2 \quad (1)$$

where thicknesses tL and tR are the dimensions of edge surface S3 at positions a predetermined distance from each document edge positions F and G. When calculating the thicknesses tL and tR, the subject line is on the interior side from the bilateral edges S2L and S2R (edge areas corresponding to the fore-edges), and is selected within a range assuming each document page and the cover are in close proximity one to another.

The borders (document surface exterior edge positions) B and C of document surface S1L and S1R, and edge surfaces S2L and S2R can be specified by calculating the page length dp. That is, the position separated by the page length dp along document surface S1L from the border position A of the bilateral pages is the left side exterior edge position B, and the position separated by the page length dp along document surface S1R from border position A is the right side exterior edge position C.

The border position A can be detected as the inflection point of the inclination of the document surface via analysis of the read image. If the page length dp is calculated and exterior edge positions B and C are specified as described above, the unnecessary images (the read images of edge surfaces S2L and S2R) can be reliably erased compared to conventional methods. The position determined by internal division of the length T of the thickness part by the ratio of the thicknesses tL and tR may be used as border position A.

Figure 6B:
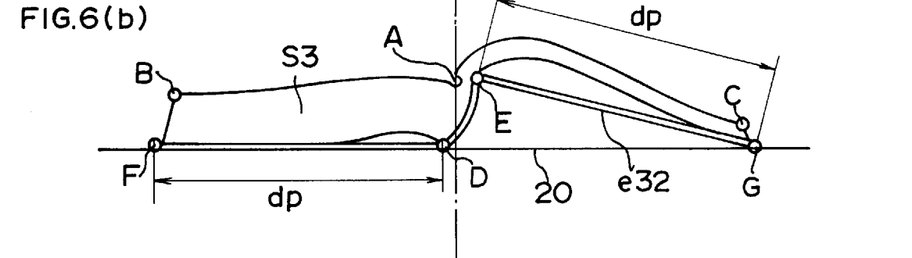
Figure 6C:
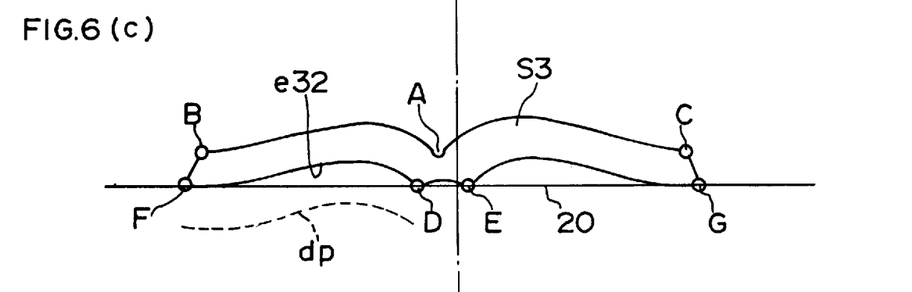
Figure 6D:
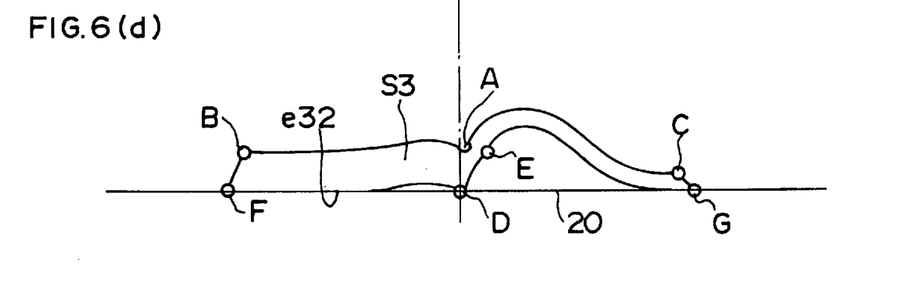

In the case of the second form shown in FIGS. 6(b) and 6(d), the height of bottom edge e32 is checked near the reference position PC, and the internal edge position D at one end of the part in contact with document table 20 is determined. The distance between one document edge position F at the exterior edge of the part in contact with document table 20 and the determined interior edge position D is designated page length dp. In this case also, the exterior edges B and C may be specified by determining the border position A and calculating the contour distance.

In the case of the third form shown in FIG. 6(c), the height of bottom edge e32 is checked near the reference line PC, and the interior edge D (or E) nearest the document edge position F at one end of the part in contact with the document table 20 is determined. The contour distance of bottom edge e32 between document edge position F and interior edge position D is calculated as the page length dp. The contour distance is a linear approximation value. In this case also, the exterior edge positions B and C may be specified by determining the border position A and calculating the contour distance.

The operation of book scanner 1 is described hereinafter with reference to the flow charts.

Figure 7:
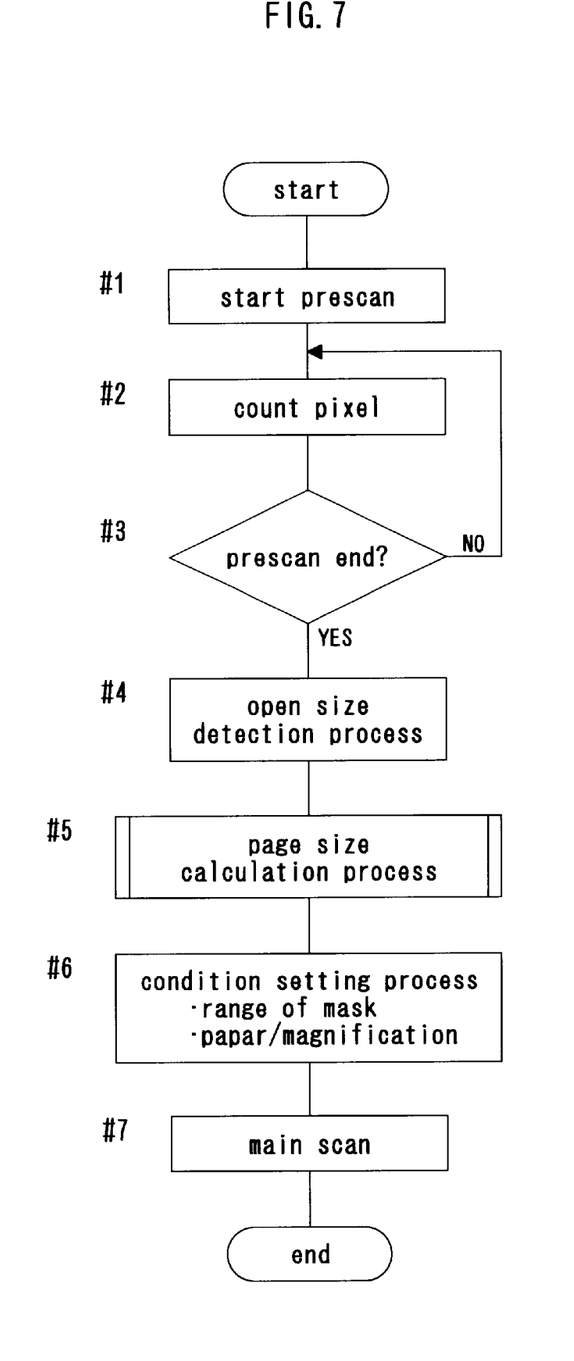
FIG. 7 is a main flow chart of processing executed by the central processing unit (CPU)

FIG. 7 is a main flow chart showing the processes executed by CPU 101.

When either of the pair of start switches 52 or 53 is turned ON, the CPU 101 issues a command to the lamp control unit 140 to turn ON the document illumination lamp, and issues a commands to scanning drive unit 132 and image sensing control circuit 131 to start the prescan (#1). During the prescan, the document height and document size are measured by comparator 111 and counter 112 as previously described (#2).

When the prescan ends (#3), the open size detection process to detect document edge positions F and G (#4), the page size calculation process to calculate the page length dp (#5), condition setting process to execute the prescan in accordance with a set mode (#6), and main scan controls (#7) are sequentially executed. Scanning preparations in the condition setting process (#6) include setting the masks to erase the exterior side of exterior edge positions B and C calculated by the page size calculation process (#5), and setting recording sheet size and magnification suitable for the page length dp.

Figure 8:
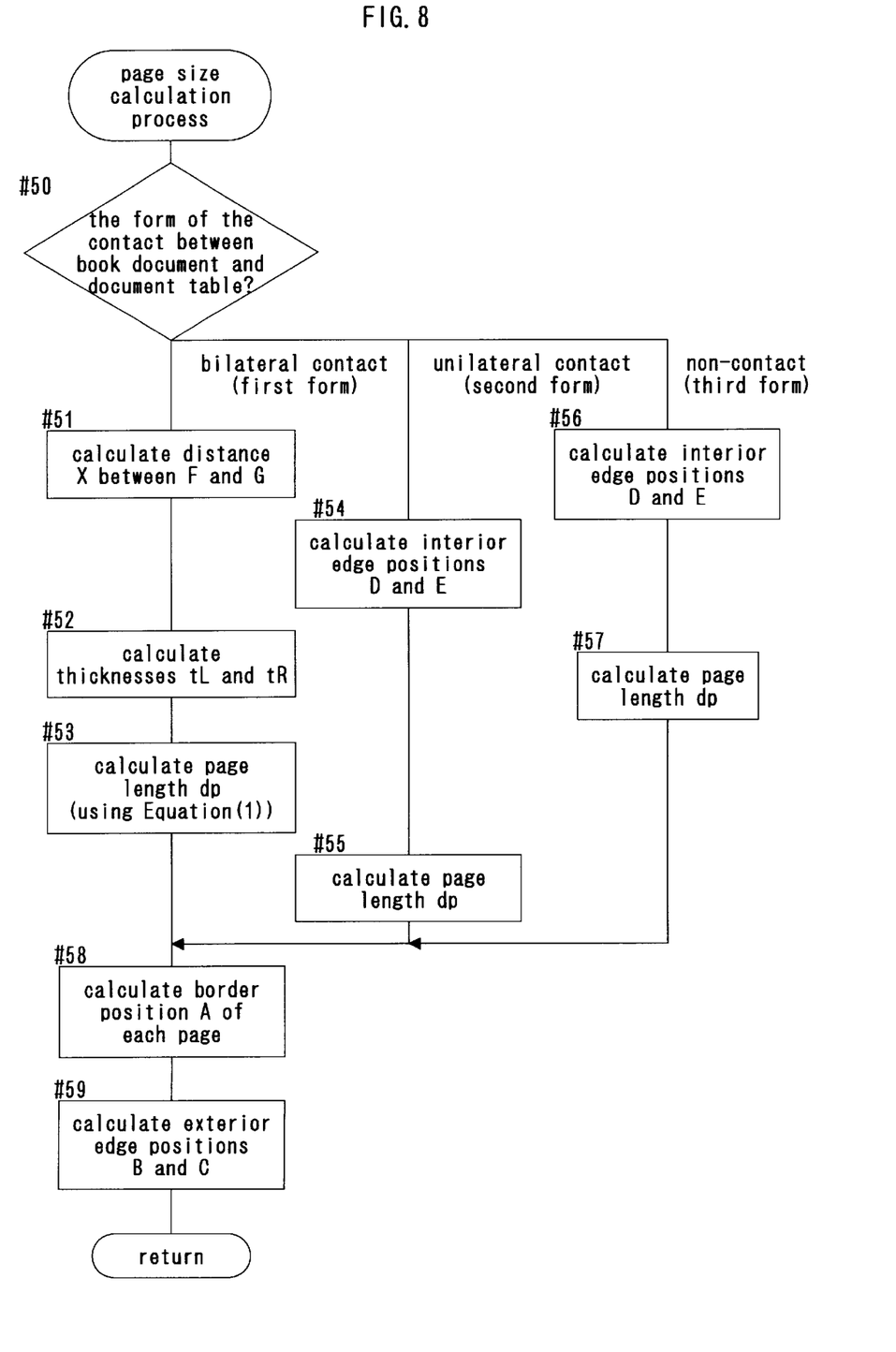
FIG. 8 is a flow chart of the page size calculation process of FIG. 7.

FIG. 8 is a flow chart sowing the page size calculation process of FIG. 7.

First, the form of the contact between book document BD and document table 20 is determined based on the reading information of projection panel 18 (#50).

In the case of the first form wherein there is bilateral contact as previously described, the distance X between document edge positions F and G, and the thicknesses tL and tR are calculated (#51, #52), and the page length dp is determined using Equation (1)(#53). In the case of the second form wherein there is only unilateral contact, the interior edge positions D and E are calculated (#54), and the linear distance between interior edges D and E and the nearest document edge position F and G are determined and set as the page length dp (#55). In the case of the third form wherein the majority of the cover is in a state of non-contact, the interior edge positions D and E are calculated (#56), and the linear distance between interior edge positions D and E and the nearest document edge positions F and G is determined and set as the page length dp (#57).

After the page length dp is calculated in accordance with the aforesaid forms, the border position A of each page is calculated (#58), and the exterior edge positions B and C specifying the image output range are calculated (#59).

Although in the foregoing examples the document edge positions F and G are determined by analyzing the read image G0, it is to be noted that the document edge positions F and G may be calculated by using an optical or mechanical sensor. In such circumstances, a sensor may be embedded in document table 20, or arranged above document table 20.

The present invention is capable of setting a suitable output image range by accurately distinguishing the size of the document surface regardless of the thickness of the document or the faded condition of the document surface.

Although the present invention has been fully described by way of examples with reference to the accompanying drawings, it is to be noted that various changes and modifications will be apparent to those skilled in the art. Therefore, unless otherwise such changes and modifications depart from the scope of the present invention, they should be construed as being included therein.

What is claimed is:

1. An image reader comprising:
    a document table which supports a open-faced document to be read;
    an image sensing means for converting a document image to electrical signals; and
    signal processing unit which outputs said electrical signals to external devices,
    wherein said image reader constructed so as to be capable of reading edge surface in a direction perpendicular to a lateral direction of the open-faced document and said signal processing unit is provided with
        size detection means for detecting document edge positions on bilateral sides of said open-faced document in the lateral direction,
        a page size calculation means for calculating a length of one page in the lateral direction of said open-faced document based on the read information of the edge surface and the document edge positions detected by said document size detection means, and output range setting means for setting an image output range in accordance with the length of one page calculated by said page size calculation means.

2. The image reader as claimed in claim 1, wherein, based on the read information of said edge surfaces, said page size calculation means determines a difference between a sum of length of said edge surfaces in a document thickness direction at each edge and a distance between said bilateral edge positions so as to calculate ½ a length of said difference as a length of one page in a case wherein the edge on a side opposite the document surface is parallel to a document support surface.

3. The image reader as claimed in claim 1, wherein, based on the read information of said edge surfaces, said page size calculation means calculates a length of a part of said edges parallel to a document support surface as a length of one page in a case wherein said edge is parallel only on a unilateral side.

4. The image reader as claimed in claim 1, wherein, based on the read information of said edge surfaces, said page size calculation means calculates a contour distance of said edge between the document edge position on one side detected by said document size detection means and a position nearest said document edge position at a same height as said document edge position near a center of an edge surface in a lateral direction as a length of one page.

5. The image reader as claimed in claim 1, wherein, based on the read information of said edge surfaces, said page size calculation means discriminates a first case wherein the edge on a side opposite a document surface is parallel to a document support surface, a second case wherein said edge is parallel only on a unilateral side, and a third case of all other occurrences, and in said first case determines a difference between a sum of length of said edge surface in a document thickness direction at each edge and a distance between said bilateral edge positions so as to calculate ½ a length of said difference as a length of one page, and in said second case calculates a length of a part of said edges parallel to the document support surface as the length of one page, and in said third case calculates a contour distance of said edge between the document edge position on one side detected by said document size detection means and the position nearest said document edge position at a same height as said document edge position near a center of the edge surface in a lateral direction as the length of one page.

6. The image reader as claimed in claim 1 further comprising:

an automatic magnification means for varying a magnification of a read image suitable for a specified recording sheet in accordance with the page size.

7. The image reader as claimed in claim 1 further comprising:

an automatic paper selection means for selecting a recording sheet suitable to a specific magnification in accordance with the page size.

8. A method of processing an image of an open faced document placed on a document platen, the method comprising the steps of:

reading edge surfaces in a direction perpendicular to a lateral direction of a document detecting document edge positions on bilateral sides of said open-faced document in the lateral direction calculating a length of one page in the lateral direction of said open-faced document based on the read information of the edge surfaces and the document edge positions, and setting an image output range in accordance with the length of one page.

9. The method as claimed in claim 8, said calculating step includes determining, based on the read information of said edge surfaces, a difference between a sum of length of said edge surfaces in a document thickness direction at each edge and a distance between said bilateral edge positions so as to calculate ½ a length of said difference as a length of one page in a case wherein the edge on a side opposite the document surface is parallel to a document support surface.

10. The method as claimed in claim 8, said calculating step includes calculating, based on the read information of said edge surfaces, a length of a part of said edges parallel to a document support surface as a length of one page in a case wherein said edge is parallel only on a unilateral side.

11. The method as claimed in claim 8, said calculating step includes calculating a contour distance of said edge between the document edge position on one side detected by said document size detection means and a position nearest said document edge position at a same height as said document edge position near a center of a edge surface in a lateral direction as a length of one page.

12. The method as claimed in claim 8, said calculating step includes discriminating a first case wherein the edge on a side opposite a document surface is parallel to a document support surface, a second case wherein said edge is parallel only on a unilateral side, and a third case of all other occurrences, and includes determining a difference between a sum of length of said edge surface in a document thickness direction at each edge and a distance between said bilateral edge positions so as to calculate ½ a length of said difference as a length of one page in said first case, and calculating a length of a part of said edges parallel to the document support surface as the length of one page in said second case, and calculating a contour distance of said edge between the document edge position on one side detected by said document size detection means and the position nearest said document edge position at a same height as said document edge position near a center of the edge surface in a lateral direction as the length of one page in said third case.

13. The method as claimed in claim 8 further includes:

varying the magnification of a read image suitable for a specified recording sheet in accordance with the page size.

14. The image reader as claimed in claim 8 further includes:

selecting a recording sheet suitable to the specific magnification in accordance with the page size.

15. An image reader comprising:

an image sensor which converts a document image into electrical signals; and a signal processing unit which outputs said electrical signals to external devices, wherein said image reader is constructed so as to be capable of reading an edge surface in a direction perpendicular to a lateral direction of the open-faced document and said signal processing unit is provided with a size detection device which detects document edge positions on bilateral sides of said open-faced document in the lateral direction, a page size calculation device which calculates a length of one page in the lateral direction of said open-faced document based on the read information of the edge surface and the document edge positions detected by said size detection device, and an output range setting device which sets an image output range in accordance with the length of one page calculated by said page size calculation device.

16. The image reader as claimed in claim 15, wherein, based on the read information of said edge surface, said page size calculation device determines a difference between a sum of length of said edge surface in a document thickness direction at each edge and a distance between said bilateral edge positions so as to calculate ½ a length of said difference as a length of one page in a case wherein the edge on a side opposite the document surface is parallel to a document support surface.

17. The image reader as claimed in claim 15, wherein, based on the read information of said edge surface, said page size calculation device calculates a length of a part of said edges parallel to a document support surface as a length of one page in a case wherein said edge is parallel only on a unilateral side.

18. The image reader as claimed in claim 15, wherein, based on the read information of said edge surface, said page size calculation device calculates a contour distance of said edge between the document edge position on one side detected by said document size detection device and a position nearest said document edge position at a same height as said document edge position near a center of an edge surface in a lateral direction as length of one page.

19. The image reader as claimed in claim 15, wherein, based on the read information of said edge surface, said page size calculation device discriminates a first case wherein the edge on a side opposite a document surface is parallel to a document support surface, a second case wherein said edge is parallel only on a unilateral side, and a third case of all other occurrences, and in said first case determines a difference between a sum of length of said edge surface in a document thickness direction at each edge and a distance between said bilateral edge positions so as to calculate ½ a length of said difference as a length of one page, and in said second case calculates a length of a part of said edges parallel to the document support surface as the length of one page, and in said third case calculates a contour distance of said edge between the document edge position on one side detected by said size detection device and the position nearest said document edge position at a same height as said document edge position near a center of the edge surface in a lateral direction as the length of one page.

20. The image reader as claimed in claim 15 further comprising:

an automatic magnification device which varies a magnification of a read image suitable for a specified recording sheet in accordance with the page size.

21. The image reader as claimed in claim 15 further comprising:

automatic paper selection device which selects a recording sheet suitable to a specific magnification in accordance with the page size.

\* \* \* \* \*